(12) United States Patent
Weibel et al.

(10) Patent No.: US 6,505,173 B1
(45) Date of Patent: Jan. 7, 2003

(54) METHOD FOR ELECTRONICALLY MERGING DIGITIZED DATA SYSTEM OF GENERATING BILLING STATEMENTS FOR PUBLISHED ADVERTISING

(75) Inventors: Willard J. Weibel, Malvern, PA (US); Maria Elena Lopez, Hinsdale, IL (US); John Metsig, Barrington, IL (US)

(73) Assignee: Electronic Imaging Systems of America, Inc., Rolling Meadows, IL (US)

( * ) Notice: Subject to any disclaimer, the term of this patent is extended or adjusted under 35 U.S.C. 154(b) by 0 days.

(21) Appl. No.: 09/418,744

(22) Filed: Oct. 15, 1999

Related U.S. Application Data

(60) Provisional application No. 60/104,538, filed on Oct. 16, 1998.

(51) Int. Cl.[7] ............................................. G06F 17/60
(52) U.S. Cl. ......................................... 705/34; 705/30
(58) Field of Search ................................ 705/27, 10, 2, 705/3, 30, 34, 40; 455/406, 408, 407; 348/114, 118; 707/104.1

(56) References Cited

U.S. PATENT DOCUMENTS 6,026,368 A * 2/2000 Brown et al. .................. 705/14
6,167,382 A * 12/2000 Sparks et al. .................. 705/26
6,173,271 B1 * 1/2001 Goodman et al. ............. 705/40

FOREIGN PATENT DOCUMENTS

EP          745947 A2 * 12/1996
WO       WO-97/24680    * 7/1997

* cited by examiner

Primary Examiner—Douglas Hess
Assistant Examiner—Elaine Gort
(74) Attorney, Agent, or Firm—Pauley Petersen Kinne & Erickson

(57) ABSTRACT

A method of constructing a billing statement for publishing advertising or the like starts with digitizing the advertisement and the publication page the advertisement is on and assigning a unique identifier to at least the advertisement in an information header associated with the published image of the advertisement copy. The publication page may also be uniquely identified apart from the advertisement and contain reference to the advertisements thereon in its information header. An invoice is generated which searches at least the publication page database to find both the advertisement and page documents. The advertisement and page documents are copied and stored with the billing statement in a separate file where they are linked or merged into one document so that manual preparation of invoices with advertisement copy and tear sheets no longer need be done.

12 Claims, 2 Drawing Sheets

METHOD FOR ELECTRONICALLY MERGING DIGITIZED DATA SYSTEM OF GENERATING BILLING STATEMENTS FOR PUBLISHED ADVERTISING

This application claims benefit of Provisional Application 60/104,538 filed Oct. 16, 1998.

BACKGROUND OF THE INVENTION

1. Field of the Invention

The present invention relates to means for creating a billing statement automatically and digitally with attached advertising copy and the published page containing such advertising copy.

2. Discussion of Related Art

Publishers of periodicals and dailies derive significant revenue from printing advertisements in their publications. Traditionally, the method of billing the advertiser, or customer, for the publication of the customer's advertisement is to send a billing sheet, or statement, listing the date of publication, an advertisement identifier, and the charge for the advertisement. Along with each billing line item is included a copy of the advertisement and a copy of the actual page or pages on which the advertisement was published. These hard copies of the advertisements and page are often called tearsheets. The tearsheets were, in the past, manually created by persons who gathered the physical tearsheets and attached them to the billing statements, resulting in a great expenditure of labor. Also, the billing statement created in this way can become physically bulky and unnecessarily hard to handle and expensive to deliver to the customer.

Therefore, there exists a need to automate this billing process and digitize it to make for easier storage and delivery.

SUMMARY OF THE INVENTION

The present invention provides for automated creation, and if desired, removable storage and delivery of billing statements for published advertisements. A method according to the present invention requires that the advertisement copy and the page on which it is published, if different, both be put in a digital document format such as tiff,jpeg or the like; and assigned unique customer, or advertiser, identifiers, such as serial numbers, identifying numbers, unique names, or the like associated with the document. The advertisement copy and the page may contain cross referenced indicators. For example, the information header on the advertisement copy may contain information on its page location, while the page document information header may contain information on each customer having an advertisement thereon.

The advertisement copy and page files of images and their associated information headers are created; whether by original composition on a digital publishing system or through later digitization by scanning or the like; and stored in a first, or first and second publications searchable database. A billing statement application is then overlayed on or interfaced with the publications databases in order to match the unique identifiers of the customers in the statement application to the unique customer identifiers in the publications databases. A search and retrieve command is sent to identify each advertisement and its associated page, within a particular date range and for a particular publication, if the publication database file structure makes this necessary. Copies of the digital documents representing the published advertisement copy and its associated page are linked, or referenced, to the billing document line items and stored as files within the billing statement application.

The billing statement, with each associated advertisement copy and page image, may then be electronically accessed through the billing statement application and transmitted electronically or stored on removable digital storage media such as diskettes or CD-Roms as desired for permanent record and shipping to the customer.

DESCRIPTION OF PREFERRED EMBODIMENTS

Figures 1, 2:
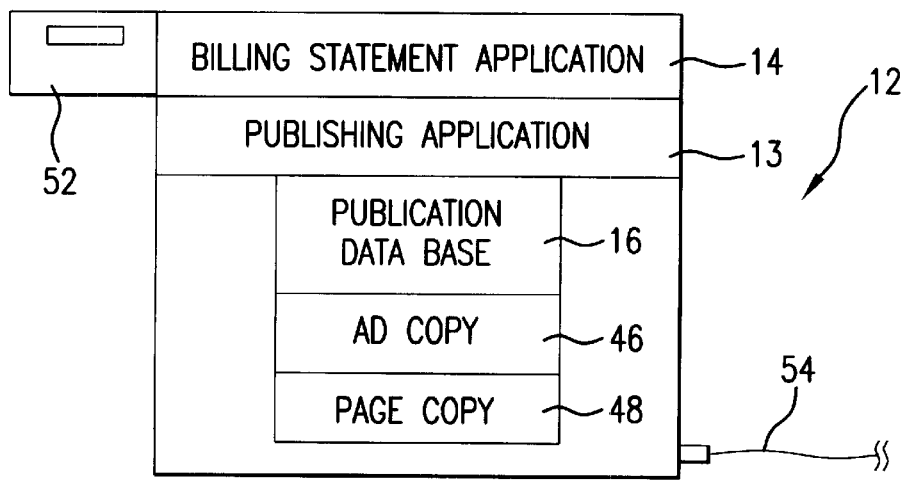
FIG. 1 is a billing statement document according to the present invention.
FIG. 2 illustrates a computer system for running a billing system according to the present invention.

Referencing FIGS. 1 and 2, a billing statement template 10 is contained in the server of a computer system 12 within a billing statement application 14. The computer system 12 further contains a publication database 16 generally associated with an electronic publishing/composition application 13 for the digital construction of stories, text, pictures, advertisements, and the like making up a publication such as a newspaper or magazine.

Figures 3, 4:
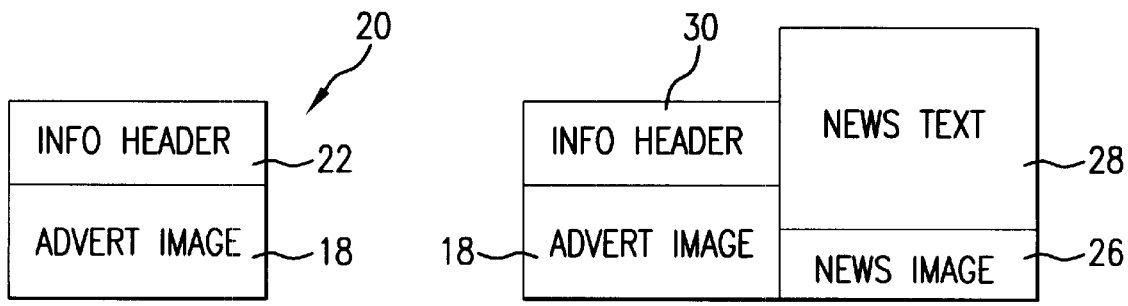
FIG. 3 illustrates an advertisement, or ad copy, retrievable by the present invention.
FIG. 4 illustrates the publication page on which the advertisement copy appears.

As seen in FIG. 3, an advertisement image copy 18 comprising text, pictorial images, and the like; is contained in a digital advertisement document 20 which also contains an information header 22 containing a customer identifier, such as a unique name, number, or the like associated with the customer paying for the publication of the image copy 18.

Referencing FIG. 4, the advertisement image copy 18, when it is to be published, is digitally placed within a page site 24 of a publication, along with other images 26, text files 28, and the like which make up that page 24 of the publication. The page site 24 contains an information header 30 containing such information as the publication name, date, page number, document file identifiers, advertiser customer identifier listings, etc.

Figure 5:
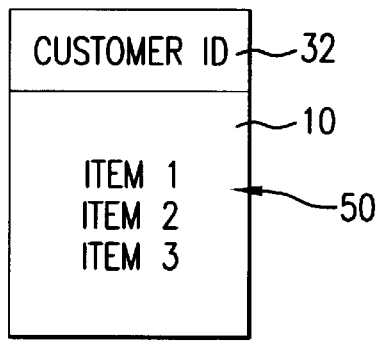
FIG. 5 schematically illustrates the digital billing statement, or invoice of the present invention document.

Referencing FIG. 5, the billing statement or invoice 10 has a customer identifier 32 which may be the same as a customer identifier 34 in the publication database 16 or the two customer identifiers may be cross referenced in the billing statement application 14.

Figures 6, 7:
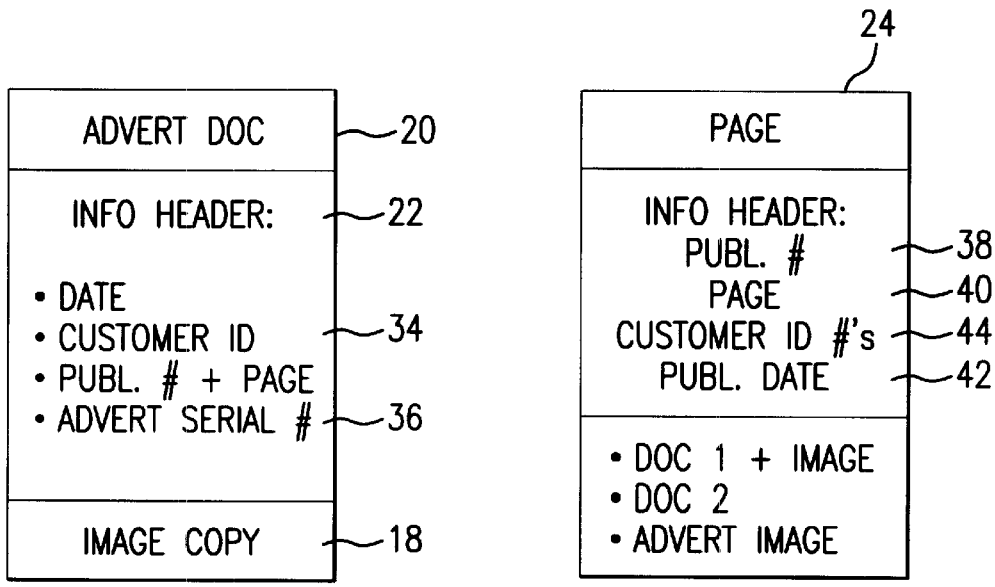
FIG. 6 schematically illustrates the digital advertisement copy document and information statement.
FIG. 7 schematically illustrates the digital publication page containing the advertisement copy and an information header thereof

Referencing FIG. 6, the digital advertisement document 20 contains an information header 22 with all relevant information such as the customer identifier 34 and an advertisement copy serial number 36 identifying the particular image 18 of the advertisement which is preferably a separate file within the advertisement document 20.

Referencing FIG. 7, the page site 24 is a document, or group of cross referenced documents, with an information header 30 detailing the publication number 38, the page number 40, publication date 42, and a list of the customers identifiers 44 for the advertisements placed on that page.

With the information headers as shown in FIGS. 6 and 7, a search and retrieve routine can be initiated from the billing statement application 14 for an individual customer by specifying a customer identifier and any qualifying ranges for the billing cycle such as a date range, publication volume numbers, etc. The customer identifiers may be cross matched as necessary between the billing statement application and the publishing application through the use of look up tables, a precompiled and referenced association table or the like. The search will then take place in the publication database either in the advertisement copy information headers database 46 or the page site information headers database 48, or both, depending on how the publication application has allotted the customer identifiers and linked the associated advertisement images between the advertisement copy database and the page site database. Each instance of a customer identifier number "hit", or retrieval, will have an associated advertisement copy number and data identifier associated therewith. Each instance of a customer's advertisement being published then is listed as a line item, logo 50, on the billing statement 10. Copies of the digital advertisement document 20 and the page site 24 are retrieved, cross referenced to the line items 50 and the billing statement 10, and stored in or with the billing statement application 14 and in addition may be printed to removable storage 52 or downloaded as by telephone line 54 to the customer's information systems (not shown).

While referred to as files, documents, and sites, it will be appreciated that there are myriad ways to cross reference, store, and process the relevant image blocks going into the advertisement copy and page site make up. The examples of the Preferred Embodiment are intended to be illustrative only and the invention herein is limited only by the appended claims.

We claim:

1. A method of constructing a billing statement for advertising customers placing advertisements in print publications, comprising:
   a. creating a printed advertisement image on a printed publication page;
   b. establishing a unique customer identifier for each customer;
   c. creating a first digital document representing the printed advertisement image with a unique print advertisement identifier and associating the unique customer identifier with the unique print advertisement identifier;
   d. creating a second digital document representing an image of the printed publication page containing the printed advertisement image and associating the second digital document with the unique print advertisement identifier;
   e. creating a third digital document representing an invoice for the printed advertisement image including specifying an identifier range for invoiced print advertisements;
   f. finding the first digital document by searching the unique customer identifier in a first database and copying the first digital document to an invoice database and listing each found first digital document as a line item on the invoice;
   g. finding the second digital document and copying the second digital document to the invoice database; and
   h. storing the first and second digital documents in a common file associated with the third digital document.

2. The method of claim 1 further including finding the second digital document by searching the unique advertisement identifier.

3. The method of claim 1 further including finding the second digital document by searching the unique customer identifier.

4. The method of claim 1 including the further step of copying the first, second, and third digital documents to a removable storage medium.

5. The method of claim 1 including the further step of listing each advertisement identifier as a line item on the invoice document.

6. The method of claim 1 including the further step of displaying the first, second, and third digital documents in human readable format.

7. A method of constructing a billing statement for published advertisements comprising:
   a. establishing a unique customer identifier for a customer to be billed;
   b. creating a digital billing invoice document and associating the digital billing invoice document with the unique customer identifier and storing the digital billing invoice document in an invoice file;
   c. creating a printed advertisement image on a printed publication page;
   d. creating a digital advertisement document representing the printed advertisement image with a unique advertisement identifier and associating the unique customer identifier with the unique advertisement identifier and storing the digital advertisement document in an advertisement database;
   e. creating a digital publication page representing the printed publication page, with the digital advertisement document thereon, and having a unique page identifier; and associating the unique page identifier with the unique advertisement identifier and storing the digital publication page document in a publication page database;
   f. searching for digital advertisement documents in the advertisement database according to the customer identifier, identifying digital advertisement documents according to the customer identifier, and copying identified digital advertisement documents to the invoice file;
   g. searching for digital publication pages associated with the digital advertisement documents in the publication page database and copying the associated digital publication pages to the invoice file; and
   h. cross referencing the billing invoice, advertisement, and publication page digital documents in the invoice file.

8. The method of claim 7 including the further step of copying the billing invoice, advertisement, and publication page digital documents to a removable storage medium.

9. The method of claim 7 including the further step of listing each digital advertisement document as a line item on the invoice document.

10. The method of claim 9 including the further step of displaying the billing invoice, advertisement, and publication page digital documents in human readable format.

11. The method of claim 9 wherein the step of
   creating the digital billing invoice document includes specifying an identifier range for the digital advertisement documents.

12. The method of claim 11 wherein the step of
   specifying an identifier range further includes specifying a date range on which the digital advertisement documents were published in print.

* * * * *